(12) United States Patent
Immonen et al.

(10) Patent No.: US 7,187,905 B2
(45) Date of Patent: Mar. 6, 2007

(54) METHOD AND ARRANGEMENT FOR IMPROVING THE ACCURACY OF POSITIONING-RELATED TIME MEASUREMENTS IN RADIO SYSTEM

(75) Inventors: Ari Immonen, Oulu (FI); Petri Toljamo, Oulu (FI)

(73) Assignee: Nokia Corporation, Espoo (FI)

( * ) Notice: Subject to any disclaimer, the term of this patent is extended or adjusted under 35 U.S.C. 154(b) by 632 days.

(21) Appl. No.: 10/609,688

(22) Filed: Jul. 1, 2003

(65) Prior Publication Data

US 2004/0073392 A1    Apr. 15, 2004

(30) Foreign Application Priority Data

Jul. 1, 2002    (FI) .................................. 20021299

(51) Int. Cl.
*H04B 17/00* (2006.01)
(52) U.S. Cl. ................. 455/67.11; 455/67.14; 455/226.1; 455/226.2
(58) Field of Classification Search ............. 455/67.11, 455/67.14, 226.1, 226.2, 226.3
See application file for complete search history.

(56) References Cited

U.S. PATENT DOCUMENTS 6,184,829 B1  2/2001  Stilp
6,385,441 B1 * 5/2002  Takakusaki ............... 455/226.1
6,633,559 B1 * 10/2003  Asokan et al. ............. 370/350
2002/0183069 A1 * 12/2002  Myr ........................... 455/456

FOREIGN PATENT DOCUMENTS

WO    WO 01/54422 A2    7/2001

* cited by examiner

*Primary Examiner*—Matthew Anderson
*Assistant Examiner*—Tuan Pham
(74) *Attorney, Agent, or Firm*—Squire, Sanders & Dempsey L.L.P.

(57) ABSTRACT

The invention relates to a method and arrangement for improving the accuracy of time measurements related to positioning in a radio system. In the method, a test signal is generated; the test signal is directed to travel through pre-selected radio frequency parts of a receiver used in positioning in the radio system; the propagation delay of the test signal through the pre-selected radio frequency parts is determined; and the determined propagation delay is used to improve the accuracy of time measurement related to positioning.

34 Claims, 6 Drawing Sheets

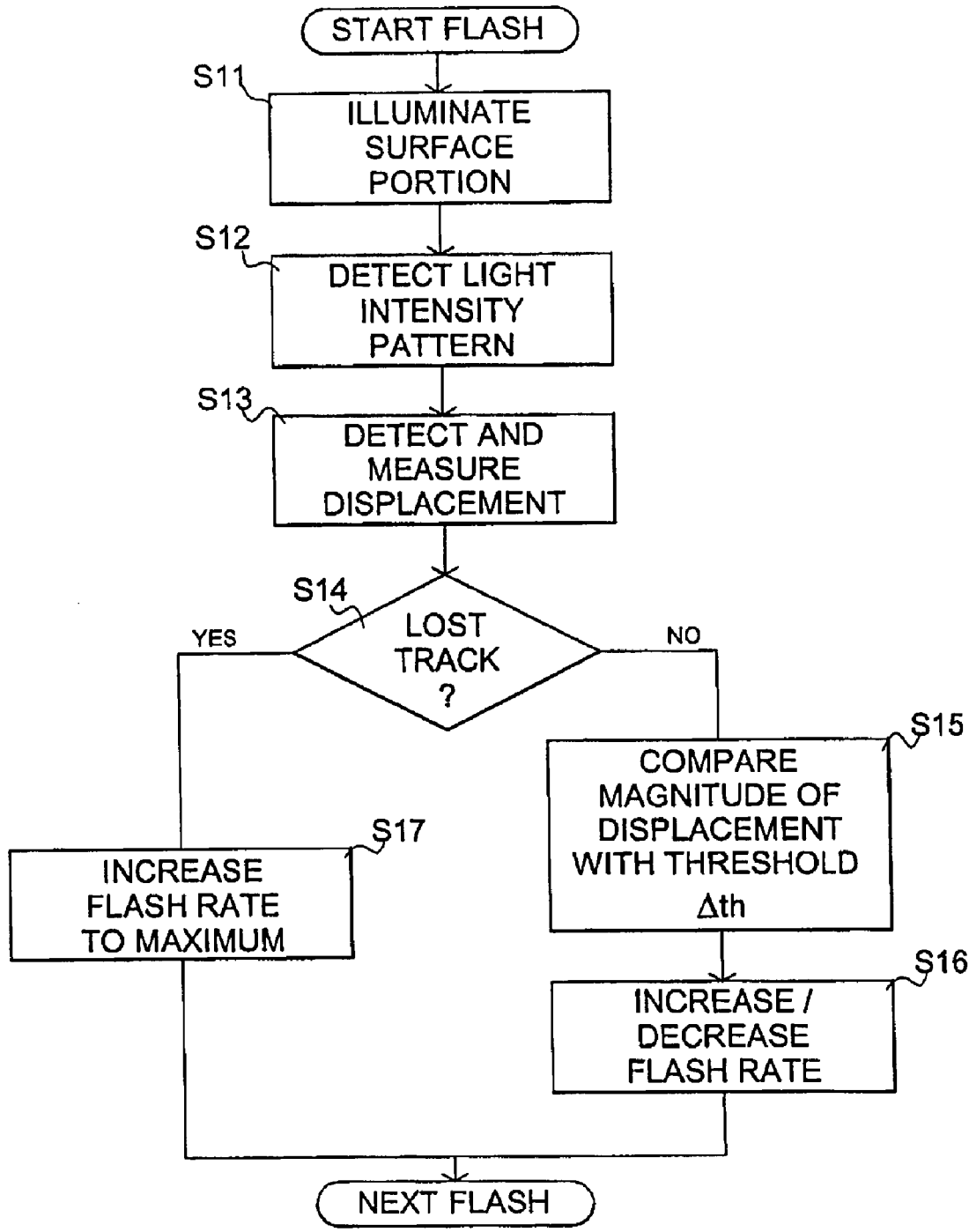

METHOD AND ARRANGEMENT FOR IMPROVING THE ACCURACY OF POSITIONING-RELATED TIME MEASUREMENTS IN RADIO SYSTEM

BACKGROUND OF THE INVENTION

1. Field of the Invention

The invention relates to a method and arrangement for improving the accuracy of time measurements related to positioning in a radio system.

2. Description of the Related Art

Interest in and need for positioning subscriber terminals of cellular networks, i.e. defining the geographical location of subscriber terminals, has lately increased significantly. By utilizing positioning, it is possible to implement numerous commercial services, such as navigation services assisting a user, fleet (trucks, taxis, busses) monitoring and management services, or services for the positioning of children or other relatives and friends. Network operators can utilize positioning in defining different tariff zones or for the provision of targeted advertisement services. The authorities are also interested in positioning. For instance, the Federal Communication Commission of the United States has requested that it be possible to position all subscriber terminals making an emergency call at an accuracy of 50 meters. Recommendations for the positioning of subscriber terminals making emergency calls also exist in the European Union.

A positioning service can be implemented in several ways. On the most basic level, a subscriber terminal can be positioned on the basis of the identity of the cell serving it (cell ID based method). The obtained result is, however, not very accurate, because one cell can cover dozens of kilometers.

A better result is obtained by using as additional information timing information of the radio link, such as the timing advance (TA). In the GSM (Global System for Mobile Communications) system, for instance, TA indicates the location of a subscriber terminal at an accuracy of approximately 550 meters. However, the positioning accuracy varies depending on the used antenna solution. If the cell has an omnidirectional antenna, for instance, the location of the subscriber terminal is known relative to a base station on a circle drawn around it. Sectoring the base station into three parts, for instance, improves the situation somewhat, but even then the subscriber terminal can only be positioned to a 120-degree sector in a 550-meter deep area at a specific distance from the base station.

Even the above inaccurate methods are sufficient for some applications, such as for defining tariff zones. In addition, other more accurate methods have, however, also been developed.

These methods include uplink methods that are based on the fact several different base stations perform measurements on the signal transmitted by the subscriber terminal. One example of these is the TOA (Time of Arrival) method.

One positioning method is also the use of a GPS (Global Positioning System) receiver located in the subscriber terminal. The GPS receiver receives a signal transmitted by at least four earth-orbiting satellites, on the basis of which it is possible to calculate the latitude, longitude and altitude of the location of the subscriber terminal. The subscriber terminal can perform the calculation independently or it can be assisted, in which case it is called network-assisted GPS positioning.

In downlink methods, the subscriber terminal makes measurements on signals transmitted by several different base stations. One example of such a method is the E-OTD (Enhanced Observed Time Difference) method. Because the radio network is never fully synchronous in practice, the actual timing of the signals transmitted by the base stations must be measured. This can be done for instance by using a location measurement unit (LMU) located at a fixed, known measuring point. The effect of the actual time differences between the transmissions of defined base stations is removed by using the location measurement unit from the results measured by the subscriber terminal, after which the subscriber terminal can be positioned geometrically on the basis of the coordinates of the base stations, for instance to the intersection of hyperboles or circles depicting the propagation delay.

The 3GPP ($3^{rd}$ Generation Partnership Project) specifications define as the positioning methods supported by the radio access network of UMTS (Universal Mobile Telecommunications System), which represents the third-generation systems, not only the cell ID based method and the network-assisted GPS method, but also the OTDOA (Observed Time Difference of Arrival) method and its variant OTDOA-IPDL (Idle Period Downlink).

The OTDOA method can be considered a 3G-system counterpart for the E-OTD method. The OTDOA-IPDL method also utilizes the time instants when the base station cuts its transmission for a short time. During this time instant, the terminals of the cell can measure other base stations, and RTD measurements can be made.

The prior-art positioning methods are thus generally based on measuring the signals of the base stations and the timing differences between base stations. The biggest problem with the positioning accuracy is thus the accuracy of the time measurements related to positioning.

The time difference between base stations can be defined using their real time differences (RTD) that can be defined using a location measurement unit, for instance, on the basis of the signals the unit receives from the base stations. Different positioning methods, such as the E-OTD method, can also be applied by using what is known as the absolute time (AT) that can be defined relative to the GPS time defined using a GPS receiver. The GPS receiver can be located in the location measurement unit, for instance. Attempts have been made to reduce errors in time definition by improving the accuracy of the GPS measurement, for instance, but this is still a problem.

The receivers used in the measurements performed in positioning comprise, depending on the used architecture, various filters, amplifiers and DSP (Digital Signal Processor) structures, which all cause a propagation delay of their own to the receiver. These form together the group propagation delay of the receiver. The propagation delays in the different parts of the receiver vary depending on the variation of temperature, input power and supply voltage, as well as on unit-specific variations. Each of the above-mentioned variation may cause a variation of approximately 1 ns to 1 µs in each part of the receiver. In the receiver used for positioning, the variations may cause propagation delay variations of such magnitude that the positioning accuracies defined in the specifications cannot be reached.

Attempts have been made to compensate the variation of the propagation delay by using in the different stages of the receiver high-quality components, with which a certain controllable delay has been reached. The problem with this solution is the extra costs that arise from the use of the better quality components.

SUMMARY OF THE INVENTION

It is an object of the invention to provide an improved method and arrangement for improving the accuracy of time measurements related to positioning in a radio system.

The method of the invention comprises generating a test signal, directing the test signal to pass through pre-selected radio frequency parts of a receiver used by the radio system in positioning, determining the propagation delay of the test signal through the pre-selected radio frequency parts, and using the determined propagation delay in improving the accuracy of the time measurements related to positioning.

The arrangement of the invention for improving the accuracy of time measurements related to positioning in a radio system comprises at least one subscriber terminal to be positioned, and at least three base stations to be used in positioning and having known locations, with one base station acting as the serving base station to the subscriber terminal. The arrangement also comprises: a receiver to be used in positioning, means for generating a test signal, means for directing the test signal to pass through pre-selected radio frequency parts of the receiver used in positioning, means for determining the propagation delay of the test signal through the pre-selected radio frequency parts, and means for using the determined propagation delay in improving the accuracy of the time measurements related to positioning.

Preferred embodiments of the invention are set forth in the dependent claims.

The invention is based on generating a test signal and using it to measure propagation delays in a receiver used in positioning.

The method and system of the invention achieve several advantages. Because the biggest problem with positioning accuracy is the accuracy of the time measurements related to positioning, it is possible to improve the positioning accuracy considerably with the method.

One advantage of the invention is that it is not bound to any single positioning method, such as TOA, E-OTD or OTDOA method, but can be applied to any positioning method, in which the propagation delays of signals are measured.

Another advantage of the invention is that when applying solutions based on it, it is possible to use normal-price receiver structures and parts. For instance the filters used in the receiver can be simpler and less expensive than those used in the prior-art solutions, due to the lower demands set for the propagation delay.

Yet another advantage of the solution of the invention is that a propagation delay determined with it can be used to compensate a measured time delay, for instance by making the propagation delay of all used receivers the same.

One additional advantage of the method and the system applying it is the possibility to calibrate unit-specific variations in the receiver used in positioning. The method and the system according to it also contain a self-diagnostics and self-calibration option.

BRIEF DESCRIPTION OF THE DRAWINGS

The invention will now be described in greater detail by means of preferred embodiments and with reference to the attached drawings, in which FIG. 6 is a flow chart illustrating a method for improving the accuracy of time measurements related to positioning.

DESCRIPTION OF THE PREFERRED EMBODIMENTS

Figure 1:
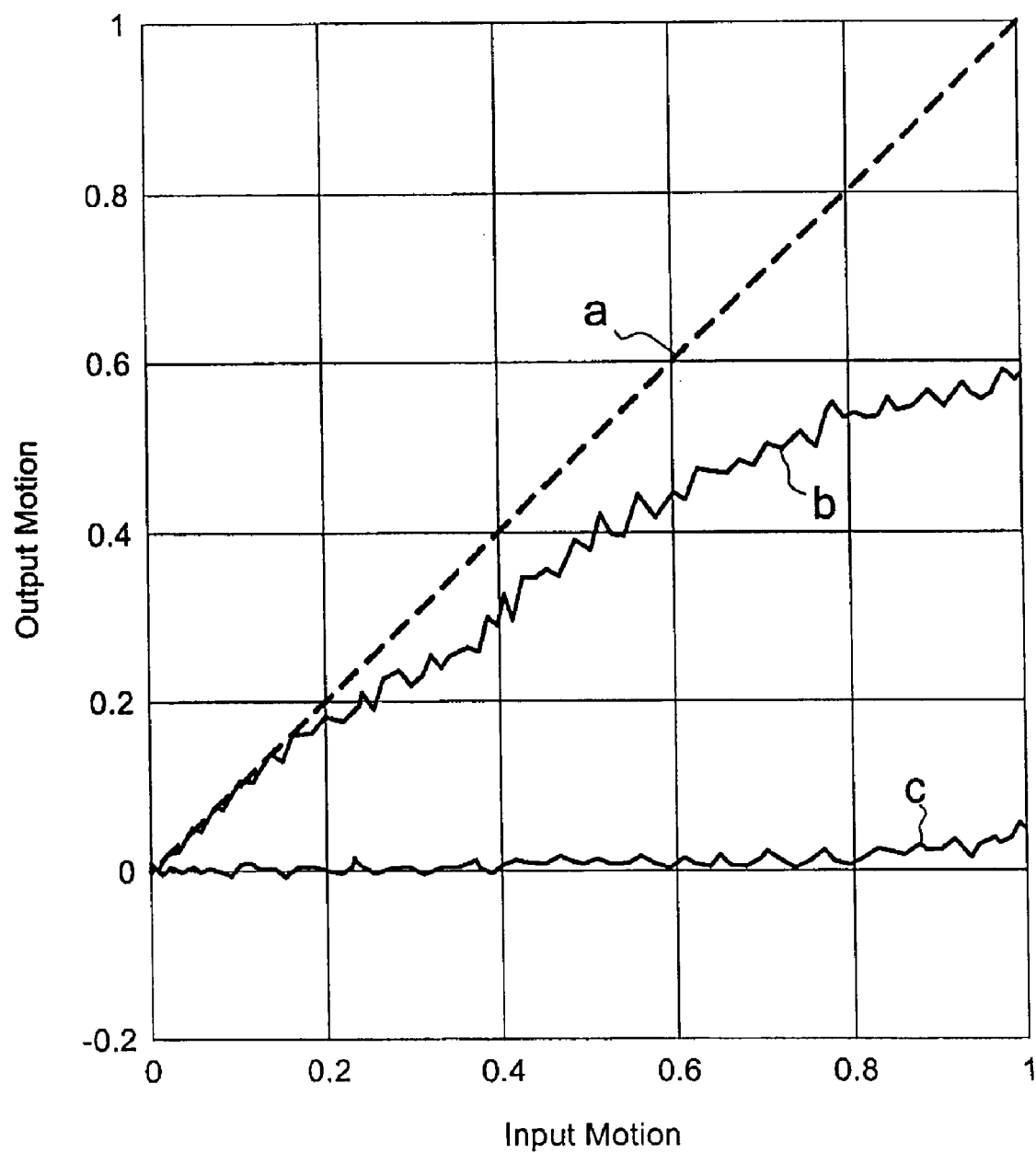
FIG. 1 is a simplified block diagram showing the structure of a radio system.

With reference to the simplified block diagram of FIG. 1, the structure of a radio system is described in general as an example of a system, to which the arrangement for improving the accuracy of time measurements related to positioning can be applied. FIG. 1 shows the most important parts of the radio system on the network element level and the interfaces between them with respect to the most important parts for the application of the invention. The structure or functions of the network elements are not described in detail, because they are generally known.

Because radio systems of the second and third generation and various hybrids thereof, i.e. the 2.5-generation radio systems, are already used worldwide and being continuously developed, the radio system of FIG. 1 comprises network elements of different generations in parallel. In the description, GSM (Global System for Mobile Communications) represents the second-generation radio system, a GSM/GPRS radio system employing GPRS (General Packet Radio System) technology based on packet-switched data transmission represents the 2.5-generation radio system, and a radio system known at least by the names IMT-2000 (International Mobile Telecommunications 2000) and UMTS represents the third-generation radio system. The EDGE (Enhanced Data Rates for Global Evolution) technology, used to increase the data transmission rate, can also be considered to belong to the 3G technologies. It can also be used to increase the transmission rates of 2G radio systems based on GSM and to implement packet transmission in the GPRS system (EGPRS) that in its present form represents the 2.5G radio system.

The embodiments are, however, not limited to these systems described as examples, but a person skilled in the art can also apply the presented solution to time measurements related to positioning in other radio systems.

The main parts of a radio system are a core network (CN) 100, radio access network 130 and user equipment (UE) 170. The radio access network 130 is in FIG. 1 indicated by the term UTRAN derived from the words UMTS Terrestrial Radio Access Network, i.e. the radio access network 130 is of the third generation and implemented by wideband code division multiple access (WCDMA) technology. FIG. 1 also shows a base station system 160 that is of the 2/2.5 generation and implemented by time division multiple access (TDMA) technology. In the 2/2.5-generation radio systems, the radio access network corresponding to the radio access network 130 of the 3G radio systems is based on the base station system 160. If the radio system is for instance an intermediate form of a GSM-based GPRS or EGPRS system and a UMTS system, in which the radio access network structure is configured in UMTS style, the radio network can be called GERAN (GSM Enhanced Radio Access Network), in which the radio interface is, however, a normal GSM-based radio interface or a radio interface employing EDGE modulation. Generally, the radio system can also be defined to comprise user equipment and a network part that contains the entire fixed infrastructure of the radio system, i.e. core network, radio access network and base station system. The user equipment can also be referred to as user device and mobile phone.

The structure of the core network 100 corresponds to a combined structure of the GSM and GPRS systems. The GSM network elements implement the circuit-switched connections and the GPRS network elements implement the packet-switched connections. Some of the network elements are, however, included in both systems.

A mobile services switching center (MSC) 102 is the center point of the circuit-switched side of the core network 100. The same mobile services switching center 102 can be used to serve the connections of both the radio access network 130 and the base station system 160. The tasks of the mobile services switching center 102 include switching, paging, user equipment location registration, handover management, and the collection of subscriber billing information. FIG. 1 shows only one mobile services switching center 102, but their number in the network may vary depending on the size of the network operator.

Large core networks 100 may have a gateway mobile services switching center (GMSC) 110 that manages the circuit-switched connections between the core network 100 and external networks 180. The external network 180 can be a public land mobile network (PLMN) or public switched telephone network (PSTN).

The core network 100 comprises a home location register (HLR) 114, visitor location register (VLR) 104 and equipment identity register (EIR) 112. The home location register 114 contains a permanent subscriber register, i.e. information on international mobile subscriber identities (IMSI), mobile subscriber ISDN numbers (MSISDN) and, when the radio system supports GPRS, PDP (Packet Data Protocol) addresses, for instance. The visitor location register 104, which contains roaming information on user equipment 170 in the area of the mobile services switching center 102, contains mainly the same information as the home location register 114, but in the visitor location register 104, the information is only temporarily. The equipment identity register 112 contains the international mobile equipment identities (IMEI) of the user equipment 170 used in the radio system.

The core network 100 also comprises an authentication center (AuC) 116 that resides physically in the same place as the home location register 114 and contains a subscriber authentication key Ki and the corresponding IMSI.

The network elements shown in FIG. 1 are functional entities whose physical implementation may vary. For instance, the mobile services switching center 102 and the visitor location register 104 usually form one physical device and the home location register 114, equipment identity register 112 and authentication center 116 a second physical device.

A serving GPRS support node (SGSN) 118 is the center point of the packet-switched side of the core network 100 and contains subscriber information and location information concerning the user equipment 170. Its main task is to send and receive packets with the user equipment 170 supporting packet-switched transmission by using the radio access network 130 or base station system 160.

A gateway GPRS support node (GGSN) 120 is the packet-switched side counterpart for the gateway mobile services switching center 110 of the circuit-switched side. Unlike the gateway mobile services switching center 110 that only routes incoming traffic, the gateway GPRS support node 120 also routes outgoing traffic from the core network 100 to external networks 182, such as the Internet.

The base station system 160 comprises base transceiver stations (BTS) 162, 164 and a base station controller (BSC) 166 controlling them. Devices implementing the radio path and their functions are usually located in the base transceiver station 162, 164, and control devices in the base station controller 166.

The tasks of the base station controller 166 include the management of the radio resources of the base transceiver station 162, 164, intercell handovers, frequency allocation to the base transceiver stations 162, 164, management of frequency hopping sequences, measurement of time delays on the uplink, implementation of the operation and maintenance interface, and power control.

The base transceiver station 162, 164 contains at least one transceiver that implements one carrier, i.e. eight time slots, i.e. eight physical channels. Typically one base transceiver station 162, 164 serves one cell, but it is also possible to have a solution, in which one base transceiver station 162, 164 serves several sectors in one cell. In third-generation radio systems, the term cell is used to refer to a sector. The diameter of one cell can vary from a few meters to dozens of kilometers. The tasks of the base transceiver station 162, 164 include the calculation of timing advance, uplink measurements, channel coding, encryption, decryption, and frequency hopping.

The radio access network 130 comprises radio network subsystems 140, 150. Each radio network subsystem 140, 150 is made up of radio network controllers (RNC) 146, 156 and B nodes 142, 144, 152, 154.

The radio network controller 146, 156 closely corresponds in functionality to the base station controller 166 of the GSM system, and the B node 142, 144, 152, 154 corresponds to the base transceiver station 162, 164 of the GSM system. There are also solutions, in which the same device is both the base transceiver station and B node, i.e. it is possible to implement both a TDMA and WCDMA radio interface with the device in question. The B node is often also called a base transceiver station, so herein the term base transceiver station will be used to mean both the GSM system base transceiver station 162, 164 and the radio access network 130 B node 142, 144, 152, 154.

The user equipment 170 comprises two parts: mobile equipment (ME) 172 and UMTS subscriber identity module (USIM) 174. USIM 174 contains information related to the user and information related to data security in particular, such as an encryption algorithm. The GSM system naturally uses the identity module of the system. The user equipment 170 contains at least one transceiver (TRX) that established a radio link to the radio access network 130 or base station system 160. The user equipment 170 can contain at least two different subscriber identity modules. In addition, the user equipment 170 comprises an antenna, user interface, and battery. There are many types of user equipment units 170, for instance car-installed units and portable ones. Today, user equipment 170 also has properties that are better known from personal or portable computers, one example being the Nokia® Communicator®.

FIG. 1 also shows the most important interfaces between different network elements. The most important interfaces in UMTS are the Iu interface between the core network and radio access network, which is divided into the circuit-switched side interface IuCS and packet-switched side interface IuPS, and the Uu interface between the radio access network and user equipment. In GSM, the most important interfaces are the A interface between the base station controller and mobile services switching center, the Gb interface between the base station controller and serving GPRS support node, and the Um interface between the base transceiver station and user equipment. The interface determines what type of messages the network elements use to communicate with each other. The aim is that the network elements of different manufacturers are able to work so well together that a working radio system is produced. However, some of the interfaces are manufacturer-dependent in practice.

Next, an arrangement for improving the accuracy of time measurements used in positioning in a radio system is described with reference to FIG. 2. The radio system can for instance be a 2.5-generation GSM/GPRS radio system, a second-generation GSM radio system, or a hybrid of the above, or a third-generation radio system according to the UMTS system employing WCDMA technology, in which case the base transceiver stations 204, 206, 208, 216, 217, 218 of the base station system in FIG. 3 represent both base transceiver stations in the base station system 160 and B nodes 142, 144 of the radio network subsystem 140 in the radio access network 130. Similarly, the base station controller 166 shown in FIG. 3 can also be a radio network controller 146 of the radio network subsystem 140.

The arrangement for improving the accuracy of time measurements used in positioning in a radio system comprises at least one user equipment 170 to be positioned and at least three base transceiver stations 204, 206, 208, 216, 217, 218 having known locations and used in positioning, with one base transceiver station 206, for instance, acting as the serving base transceiver station to the user equipment.

The base transceiver station 204, 206, 208, 214, 216, 217, 218 comprises a transceiver 205, antenna 201, and control unit 203. The base station controller 166 also comprises a control unit 230. The user equipment (UE) 170 comprises an antenna 271, through which a transceiver 275 in the user equipment 170 receives signals from the radio path 294, 296, 297, 298. A control unit 273 controls the operation of the user equipment (UE) 170. In addition to the described parts, the user equipment (UE) 170 also comprises a user interface, which is typically made up of a loudspeaker, microphone, display and keyboard, and a battery, which are, however, not described in more detail herein.

In the case of 2/2.5-generation systems, the transceivers 205, 275 use the TDMA technology and the usual GMSK (Gaussian Minimum Shift Keying) modulation of the GSM system or EDGE modulation, i.e. 8-PSK (8 Phase Shift Keying) modulation. In the case of the third-generation UMTS systems, the transceivers 205, 275 use the WCDMA technology.

The control unit 203, 273, 230 described above refers to a block controlling the operation of the device, which is nowadays usually implemented as a processor with its software, but different hardware implementations are also possible, for example a circuit built of separate logic components, or one or more client circuits, i.e. application-specific integrated circuit (ASIC). A hybrid of these different implementations is also possible. The necessary functionality can thus be implemented with the control unit 203, 273, 230. In selecting the implementation, a person skilled in the art takes into consideration the requirements set for the size and power consumption of the device, the required processing power, manufacturing costs, and production quantities.

Figure 2:
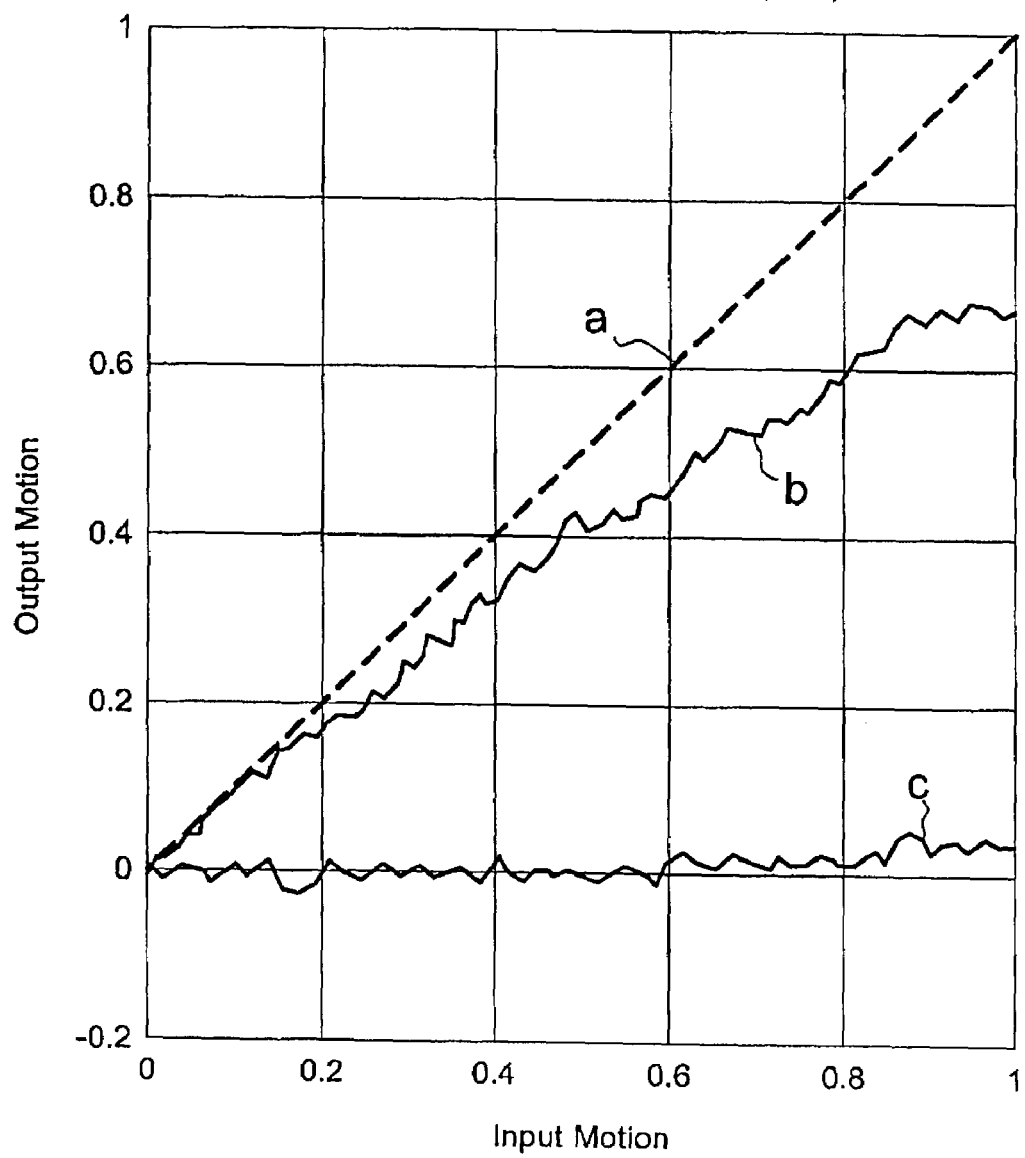
FIG. 2 is a simplified block diagram showing an example of an arrangement for improving the accuracy of time measurements used in positioning in a radio system.
Figure 3:
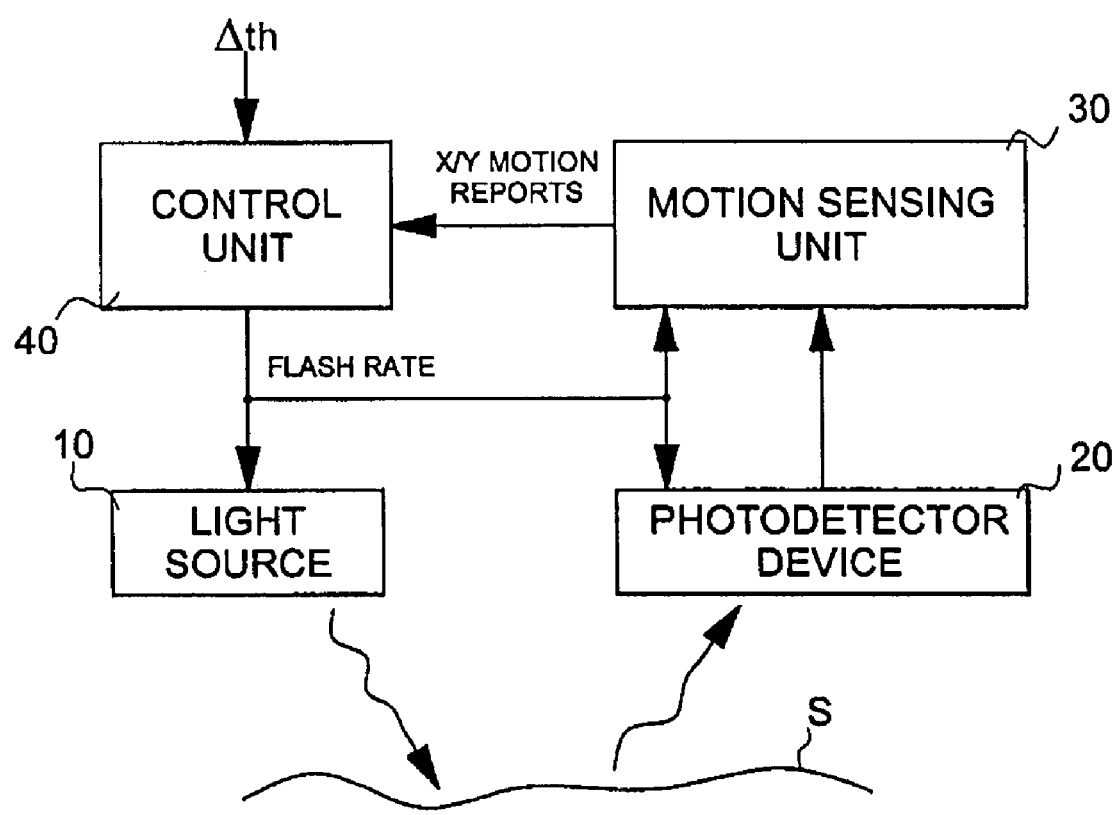
FIG. 3 is a simplified block diagram showing an example of a receiver used in positioning that is used in the arrangement for improving the accuracy of time measurements used in positioning in a radio system.

The positioning method described in FIG. 2 is according to the E-OTD positioning method used in second-generation systems or the OTDOA positioning method used in the third-generation systems. The use of different embodiments of the invention is naturally not limited only to the described positioning method, but the invention can also be applied to other positioning methods, in which time measurements can be made more accurate in the described manner.

Positioning methods are often divided into network-based (uplink) and user equipment-based (downlink) methods. In user equipment-based positioning methods the user equipment 170 can perform measurements on signals transmitted by several different base transceiver stations 204, 206, 208, 217. In the E-OTD method, which can be considered a hybrid of the network-based and user equipment-based methods, as well as in the OTDOA method, the user equipment 170 receives signals from at least three different base transceiver stations 204, 206, 208, 217 having known locations, and with one of them acting as the serving base transceiver station 206 to the user equipment and at least two acting as neighboring base transceiver stations 204, 208, 217. The user equipment 170 measures observed time differences (OTD) between the serving base transceiver station 206 and two neighboring base transceiver stations 204, 208, 217 and reports them to a serving mobile location center (SMLC) 200.

The arrangement for improving the accuracy of time measurements used in positioning in a radio system also comprises at least one receiver used in positioning, which can for instance be the receiver used by a location measurement unit (LMU) 202, 212 having a known location. The receiver used in positioning can, however, also be a receiver in the user equipment 170.

Each location measurement unit 202, 212 defines its own location measurement area, the base transceiver stations of which it measures. One of the base transceiver stations in the location measurement area serves as a reference base transceiver station for the location measurement unit, with which the receiver of the location measurement unit synchronizes. The location measurement unit 202 can be located in a base transceiver station 204, in which case it can be called LMU-b. The location measurement unit 202 can reside for instance in the control unit 203 of the base transceiver station 204, in which case it can be implemented as a functionality of the control unit, or as a separate device connected to the control unit 203 or elsewhere in the base transceiver station 204. When the location measurement unit 202 is in the base transceiver station, the reference base transceiver station is typically the base transceiver station 204, to which the location measurement unit 202 is connected.

The location measurement unit 212 can also be a separate unit, in which case it can be called LMU-a, and connected using antenna structures 211 of its own through a radio link 256, 257, 258 to a base transceiver station 216, 217, 218. An independent location measurement unit 212 can also have a cable connection to the base transceiver station 216, 217, 218 by using a link according to the E1 standard, for instance. In the example of FIG. 2, the base transceiver station 217 is selected as the reference base transceiver station of the location measurement unit 212, but any one of the base transceiver stations of the location measurement area could also serve as the reference base transceiver station.

The timing difference of the base transceiver stations can be determined in such a manner that at least one location measurement unit 202 having a known location measures the real time differences (RTD) of the base transceiver station 206 serving the user equipment 170 and its neighboring base transceiver stations 204, 208, 217 and reports them to the serving mobile location center (SMLC) 200 belonging to the devices used in positioning.

After this, the location of the user equipment 170 is defined on the basis of the geometric components (e.g. hyperboles) obtained from propagation delays. A geometric time difference (GTD) is thus the observed time difference (OTD) minus the real time difference (RTD).

The serving mobile location center (SMLC) 200 that serves as a calculation center usually resides in the base station controller (BSC) 166 or radio network controller (RNC) 146, 156, in its control unit 230, for example. It can also be a separate device that is connected to the base station controller 166. The location center (SMLC) 300 could also reside in some other part of the radio network. In the GSM systems, the positioning service can be implemented either as a base station system-oriented service, wherein the location center (SMLC) 200 is connected to the base station controller 166, or as a network subsystem-oriented service, wherein the location center 200 is connected to the mobile services switching center 102. The only solution specified in the UMTS specifications is the radio network-oriented solution, which is also defined in the GPRS specifications.

The task of the gateway mobile location center (GMLC) 226 belonging to the core network 100 is to provide the positioning service in question to an external positioning service client 228. The subscriber information and routing information of the positioning service are in the home location register 114.

The E-OTD method can also be applied by using absolute time (AT) that can be defined relative to GPS time defined using a GPS receiver. This can be done for instance in such a manner that a GPS receiver 224 is placed in the location measurement unit 202 to measure reference absolute time, which is then reported to the serving mobile location center (SMLC) 200. The location measurement unit 202 thus reports not only the RTD values of the base transceiver stations it measures, but also the reference absolute time of the reference base transceiver station, which can then be used to define the absolute time differences of the base transceiver stations used in positioning.

This example describes a situation, in which one of the base transceiver stations in the location measurement area defined by the location measurement unit is common with the location measurement area of another location measurement unit, i.e. the base transceiver station 217 is common to the location measurement units 202 and 212, i.e. the user equipment 170 is in an area that covers cells 294, 296, 298 implemented by the base transceiver stations 204, 206, 208 in the location measurement area of the location measurement unit 202 and a cell 297 implemented by the base transceiver station 217 in the location measurement area of the location measurement unit 212.

The control units 203, 273, 230 of the radio system described above and shown in FIGS. 1 and 2, which represent the block controlling the operation of the device, and the location measurement units 202, 212 and the other described blocks and units differing from the prior art can be implemented by program, for instance. They, as well as the other required means in the core network 100, radio network 130, base station network 160 and user equipment 170 can, however, also be implemented as a suitable software and hardware combination, usually a combination of software and electronics solutions executed in a processor. The typically used technology in electronics solutions is the ASIC (Application-Specific Integrated Circuit) technology, but other types of implementations are also possible, such as a circuit built of separate logic components, or a processor with software. A hybrid of these different implementation methods is also possible. In selecting the implementation method, a person skilled in the art takes into consideration the requirements set for the size and power consumption of the device, the required processing power, manufacturing costs, and production quantities. It should be noted that FIGS. 1 and 2 mainly describe functional entities, and the parts of the practical hardware implementation may vary from what is described, because it is finally a question of how to implement in the application in question most efficiently and with reasonable costs the means implementing the desired functionality.

Next, an example of a receiver used in positioning, which is used in the arrangement for improving the accuracy of time measurements used in positioning in a radio system, is described with reference to FIGS. 2 and 3.

The receiver 320 of the arrangement used in positioning can for instance be the receiver of a specific location measurement unit (LMU) 202, 212. The receiver used in positioning can also be a receiver in the user equipment of the radio system, for instance.

The receiver 320 used in positioning receives signals from the base transceiver station through an antenna 300. When the receiver 320 used in positioning is a receiver in the base transceiver station 204, the base transceiver station 206, 208, 217, the signals of which are received, is the neighboring base transceiver station 206, 208, 217 of this, so-called own, base transceiver station 204. The signals received at the receiver 320 are typically filtered, amplified, and converted to digital format. Filtering is done using a bandpass filter 302, for instance, and amplification by using an amplifier 304. After amplification, the signal is typically down-converted from carrier frequency to a lower baseband frequency in a down-converter 306 by multiplying the signal by the output frequency of a local oscillator 308. The converting can also be done from the carrier frequency to an intermediate frequency, in which case the conversion to the baseband frequency is done later. A two-intermediate-frequency frequency converter can also be used, in which the conversion is done using two intermediate frequencies, i.e. the carrier frequency is first converted to a first intermediate frequency and then to a second intermediate frequency, after which conversion to the baseband frequency takes place. After the down-conversion, the signal is converted from analog to digital in an analog-to-digital converter 310. The down-conversion can be-done to an analog signal as described above or to a digital signal, in which case the down-conversion is done after the A/D conversion. Next, the digital signals are forwarded for processing in a carrier frequency part 312; to be more precise, to a reception block 314 of the carrier frequency part 312. The signal can further be processed as desired in the carrier frequency part 312 managing the signal processing processor functions. This processing can comprise de-interleaving and decoding, for instance, as is apparent to a person skilled in the art.

The arrangement comprises a signal source block 318 that is used to generate a test signal 322 by command 317 of a control unit 316. The test signal 322 is directed by using the control unit 316 to pass through certain radio frequency parts of the receiver 320 used in positioning. After this, the propagation delay of the test signal 322 while passing through the radio frequency parts is determined using the control unit 316. Finally, the propagation delay 330 obtained from the control unit 316 is used in improving the accuracy of time measurements related to positioning.

If changes occur in the environment, it is thus possible to use the test signal 322 to measure the caused delay in the receiver used in positioning. The measurement can be performed at certain intervals, for example after every second, and at a time when the receiver used in positioning does not measure the signals of the neighboring base transceiver stations. The signal source block 318 and the control unit 316 can reside in the baseband frequency part 312 of the base transceiver station 204 or the user equipment 170 of the receiver 320 used in positioning. The group propagation delay of the receiver 320 can be controlled for instance by the DSP algorithm of a digital signal processor (DSP, not shown in FIG. 3) in the baseband frequency part 312 of the receiver.

The test signal 322 can be directed to take two routes, of which the first route goes through pre-selected radio frequency parts, and the second route past them. In FIG. 3, the first route of the test signal 322 is marked with an arrow 322 drawn with a continuous line, and the second route with an arrow 323 drawn with a dot-dash line. When the test signal 322 travels along these two routes, the propagation delay can be determined by means of the phase differences of the signals that traveled along the different routes.

If the test signal 322 travels along only one route through the pre-selected radio frequency parts, the propagation delay is determined with the time instants, when the test signal 322 starts and ends its travel through the pre-selected radio frequency parts. This is done in such a manner that the control unit 316 stores the time information it receives from the signal source block 318 concerning the time when the test signal 322 starts its travel through the radio frequency parts to be measured, and the time information concerning the time when the test signal 322 ends its travel through the selected radio frequency parts.

Alternatively, the test signal 322 can be directed to travel through different radio frequency parts of the receiver 320, i.e. the receiver chain has many possible connection points 324a, 324b, 324c, to which the test signal 322 can be directed. If it is necessary to measure the delay of almost the entire reception chain, i.e. from the antenna 300 onward, the test signal 322 is directed to the connection point 324a that is as close as possible to the antenna 300. This is called an RF loop. If the receiver delay needs to be measured from the analog-to-digital converter onward, the test signal 322 is directed to the connection point 324b that is before the analog-to-digital converter 310 in the reception chain, i.e. an analog loop is used. If it is necessary to measure the delay of the digital parts only, the test signal 322 is directed to the connection point 324c that is last in the reception chain before the digital baseband frequency part 312, i.e. a digital loop is used.

Alternatively, the arrangement can also be implemented in such a manner that the test signal 322 is received through the antenna 300, which method also shows the delay in the antenna cable, for instance.

The arrangement can also be used for self-diagnostics and calibration, in which case the test signal 322 can be directed alternately through either only one or several loops to find out the delay caused by the desired parts.

The connection points 324a to 324c can be implemented using switches or directional couplers, for instance, by means of which the test signal is connected to the reception chain and, at the same time, the reception of other signals is switched off. The connection points 324a to 324c can also be implemented using a summing element, for instance a conventional feedback loop.

The test signal 322 used in determining propagation delay can be a transmission signal (TX), i.e. the transmission signal (TX) of the transmitter in the receiver 320 used in the measurement, which can be generated in the baseband frequency part 312.

The test signal 322 can also be a non-modulated sine carrier wave (CW) that is empty of information. The signal source block 318 for generating the test signal 322 can then be for instance a phase-locked loop (PLL) equipped with a sufficiently precise synthesizer/voltage-controlled oscillator (VCO).

The test signal 322 can also be a signal generated especially for this purpose. The generation can then be accomplished using an application-specific integrated circuit (ASIC), for instance. The application-specific integrated circuit of the signal source 318 can then be located for instance in the baseband frequency part 312 of the receiver 320 used in positioning. The signal source 318 used to generate the test signal can also be an oscillator, for instance.

The test signal 322 can also be a signal that is transmitted through a common pilot channel (CPICH) used in WCDMA systems by means of the IPDL (Idle Period Down Link) method. The common pilot channel CPICH is a code channel made using a cell-specific primary scrambling code, and it is utilized in the channel estimation of connection-specific channels of the user equipment or in handover and cell selection and reselection measurements. The CPICH channel contains known parameters that correspond closely to the training sequence of the GSM system. The CPICH channel may contain idle periods, during which all channels of the transmitter are simultaneously idle. These idle periods can be bursts, i.e. between the idle periods there is a period with no idle periods. In the IPDL positioning method, the transmissions of all the channels of the transmitter stop temporarily on the downlink at the same time, and the receiver can listen to other transmitters without disturbance from its own transmitter and make the necessary measurements for positioning.

When the receiver used in positioning listens to the CPICH channels of the neighboring base transceiver stations, the test signal 322 can be a received CPICH-channel signal with the CPICH code sequence of the transmitter in the receiver 320 added to its radio frame during the idle period.

The test signal 322 can also be a separately generated CPICH signal when the CPICH channels of the neighboring base transceiver stations are not being listened to. This modulated signal, which can be generated using the ASIC of the baseband frequency part 312, for instance, can be directed through the desired radio frequency parts without transmitting it through the antenna so as not to disturb the measurements of the other base transceiver stations.

The arrangement can also be implemented in such a manner, for instance, that the receiver used in positioning is a RAKE receiver, one finger of which is directed to receive the test signal 322. The test signal 322 can then be the transmission signal of the transmitter of the receiver. The RAKE receiver is based on multipath propagation which is characteristic of cellular radio environments and in which the signal propagates along several different routes between the transmitter and receiver. The RAKE receiver utilizes different-phased signal components of the multipath propagated signal components in such a manner that when the signal components received by the different fingers are combined, the energy of the received signal is maximized. The RAKE receiver typically has several fingers, the delays of which are set to correspond to those of different signal components measured from the impulse response of the channel. RAKE receivers can be used in the UMTS (Universal Mobile Telecommunications System) systems, for instance.

The propagation delay measured by the arrangement can also be used to compensate time delay. For instance, the propagation delay of all used receivers can be set to be the same.

By means of the arrangement, it is also possible to calibrate unit-specific variations in the receiver used in positioning.

An example of an arrangement will now be described with reference to FIG. 4, in which the transmission signal (TX) 422 of the transmitter in the receiver used in positioning is used as the test signal 322. The example describes a situation, in which the receiver used in positioning is in the base transceiver station, in this case the receiver of the base transceiver station, and the transmitter is the transmitter of the base transceiver station. The transmission signal (TX) 422 serving as the test signal 322 is thus the transmission signal of the base transceiver station and generated in the transmission block 414 of the baseband frequency part 312, i.e. the transmission block 414 of the baseband frequency part 312 is the signal source block 318. In normal transmission, the transmission signal (TX) 422 generated in the transmission block 414 is typically converted from digital to analog by using a digital-to-analog converter 410, up-converted from baseband frequency to carrier frequency by using a converter 406, i.e. the baseband frequency transmission signal 422 is multiplied by the output frequency of a local oscillator 408. After this, the transmission signal 422 is typically amplified using an amplifier 404 and filtered in a band-pass filter 402 and transmitted through an antenna 300.

The transmission signal 422 can be directed to the receiver chain as a test signal 322 in the different phases of the reception chain. Therefore, the radio frequency parts of the transmission chain, through which the test signal 322 travels, for instance through the digital-to-analog converter 410 or converter 406, varies depending on the phase, in which the test signal 322 is directed to the connection point 324a to 324c of the reception chain. Directing to the connection points 324a to 324c can be done using a summing element, switch or a directional coupler, for instance.

The test signal 322 can be directed to the reception chain as a transmission-frequency signal, i.e. on the TX frequency, in which case the transmission signal 422, which was up-converted to TX frequency by multiplying it by the TX-frequency output frequency of the local oscillator 408 in the converter 406, is down-converted to RX frequency in the down-converter 306 by multiplying it by the output frequency of the local oscillator 308. Because the transmission signal 422 used as a test signal 322 is not transmitted, it is also possible, for instance in the case of a wideband system, to generate the transmission signal to be used as a test signal in reception frequency form, i.e. by using RX frequency, in which case the transmission signal 422 is multiplied by the output frequency of the RX-frequency local oscillator 308. As described in connection with FIG. 3, in this case, too, the test signal 322 can be directed to the reception chain by using either an RF loop in the connection point 324a, an analog loop in the connection point 324b, or a digital loop in the connection point 324c.

Figure 5:
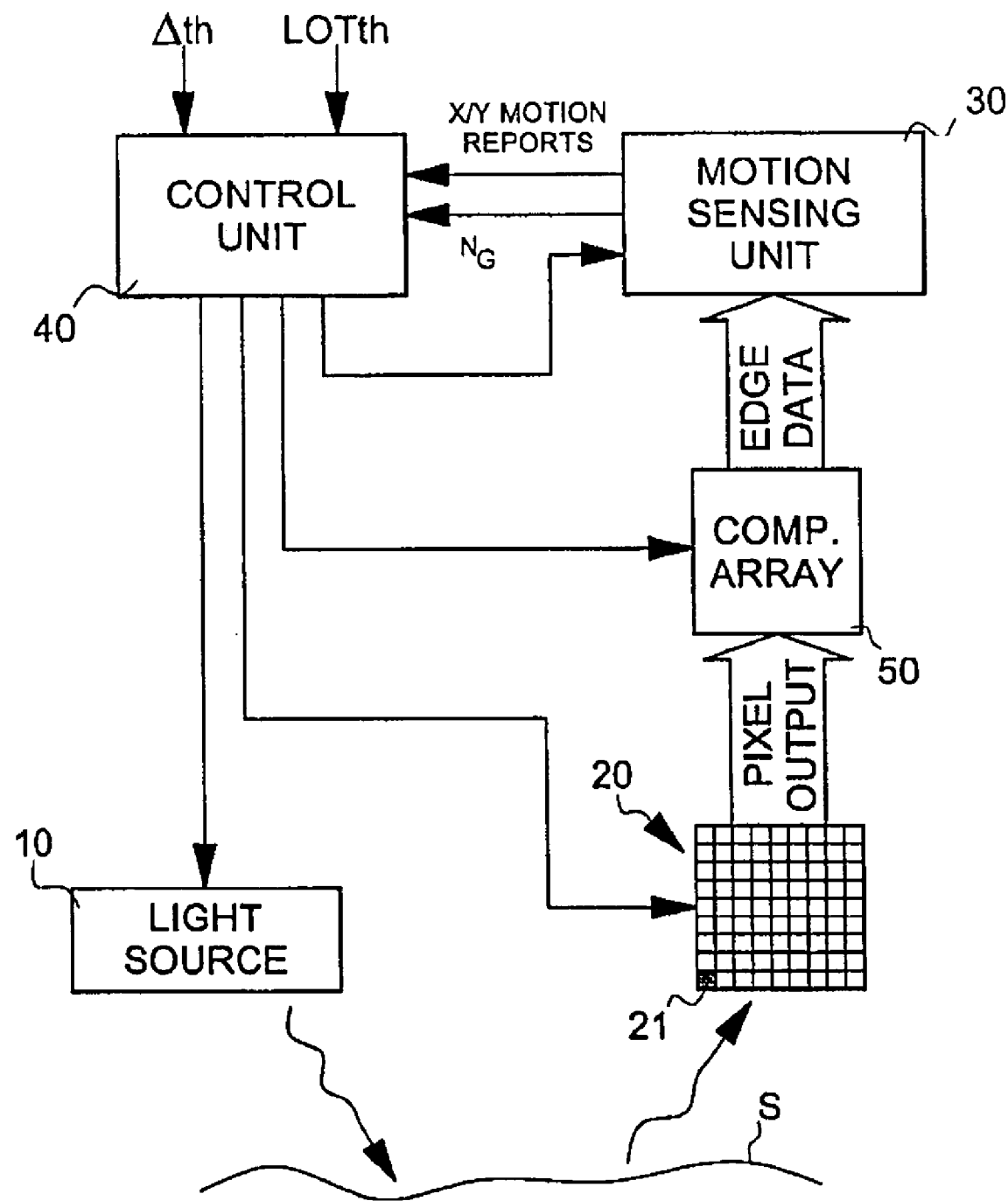
FIG. 5 is a simplified block diagram showing an example of an arrangement, in which the receiver used in positioning is in the base station and the transmission signal of the base station is used as a test signal.

Let us now describe in greater detail by means of FIG. 5 the embodiment, in which the receiver used in positioning is in the base transceiver station, more precisely the receiver of a location measurement unit (LMU) in the base transceiver station, and the transmission signal 422 of the base transceiver station is used as the test signal 322. In this case, the location measurement unit with its receiver is thus located in the base transceiver station, and consequently can also utilize for instance the antenna structures 300 of the base transceiver station. The example shows a transceiver system using different transmission/reception frequencies of several radio systems, i.e. it is a transceiver system according to the systems using the GSM-system frequencies 900 MHz and 1800/1900 MHz and the WCDMA system. A transceiver system of only one system or a combination of any two could also be used, but the arrangement is typically implemented in the product in such a manner that each different system has its own calibration channel.

The signal source block 318 starts generating the test signal 322 after receiving a start command 317 from the control unit 316. The signal source block 318 typically resides in the transmission block 414 of the baseband frequency part 312. The transmission signal 422 used as the test signal 322 is directed to the reception chain, first to the digital-to-analog converter 410. The signal source 318 communicates to the control unit 316 time information 316 on the time when the test signal 322 starts to travel through the selected radio frequency parts.

The now digital transmission signal 422 can be directed through the radio frequency parts of the TX block 550 by using an RF loop. The baseband-frequency transmission signal 422 is then converted to TX frequency, after which it is amplified. Each different frequency and system, GSM900, GSM1800/1900 and WCDMA, typically has its own converter 406 and amplifier 404 in the TX block 550. The transmission signal 422 thus travels through the converter 506g in GSM900, 507g in GSM1800/1900 and 506w in WCDMA, in which it is up-converted from the baseband frequency to carrier frequency by multiplying it with the output frequency of the local oscillator 408. From the converters 506g, 507g, 506w, the transmission signal 422 is directed for amplification to the amplifier 504g, 505g, 504w of each system. As is apparent to a person skilled in the art, the TX block 550 can also comprise, depending on the implementation method, other alternative parts, such as various intermediate frequency filters and intermediate amplifiers.

After this, in the case of the GSM system, the test signal 322 is directed to a connection point 524g that is as close as possible to a GSM antenna 500g, from which it can be transmitted through the antenna 500g or preferably directed through an antenna switch block 526 to the reception chain. The antenna switch block 526 is for instance the switch unit used in the user equipment 170 of the GSM system that is used to select either transmission or reception. A Duplex filter, for instance, can also replace the antenna switch block 526. Correspondingly, signals received through the antenna 500g are directed from the antenna 500g through the antenna switch block 526 to the reception chain. The test signal can thus be directed directly to the reception chain from the amplifier 504g, 505g of the transmission chain through the antenna switch block 526 without transmitting it to the antenna 500g so as not to disturb other receivers. From the antenna switch block 526, the test signal 322 is directed on to a filter 502g, 503g in the GSM reception chain and then on to an amplifier 514g, 513g.

In the case of the WCDMA system, the amplified test signal 322 is directed to the connection point 524w, from which it can either be directly directed to the WCDMA system antenna 500w for transmission or preferably directly through the filter 501b of the reception chain. The received signals are also directed from the antenna 500w to the filter 501b. The test signal 322 can preferably also be directed directly from the amplifier 504w of the transmission chain through the filters 501a and 501b without transmitting it to the antenna 500w. The filters 501a and 501b are Duplex filters, for instance, that are used to separate transmission and reception frequencies from each other. The test signal 322 that passed through the filters 501a and 501b is next directed to the filter 502w of the WCDMA reception chain and then on to the amplifier 514w.

Next, the test signal 322 is directed to an RX block 560, in which it is down-converted to baseband frequency with a down-converter 516g, 515g, 516w according to the reception chain of each system. In the RX block 560, the test signal 322 can typically be filtered with filters 517g, 519g, 517w, amplified with amplifiers 518g, 521g, 518w and re-filtered with filters 523g, 525g, 523w. As is apparent to a person skilled in the art, the RX block 560 can also be implemented in other ways depending on the desired receiver configuration. After the RX block 560, the test signal propagates to the analog-to-digital converter 310, in which it is converted from analog to digital form.

Time information 328 on the test signal that passed through the analog-to-digital converter 310 concerning the time instant, when the test signal ends its travel through the selected radio frequency parts, is communicated to the control unit 316 by using a detection block 540. Finally, the determined propagation delay 330 obtained from the control unit 316 is used in improving the accuracy of time measurements related to positioning. The calculation can be performed in the control unit 316 of the receiver 320, or typically in the serving mobile location center (SMLC) 200, to which the propagation delay information is signaled.

In an alternative embodiment, an analog loop can be used, i.e. a test signal 322 according to each system can be directed from the digital-to-analog converter 410 directly to a connection point 544g, 545g, 544w of each system, and then on to the analog-to-digital converter 310, i.e. an analog loop is used, in which the test signal 322 is directed without conversion directly as a baseband-frequency signal to the receiver chain. The signal can then also be directed to the reception chain directly as an RX-frequency signal instead of a TX-frequency signal.

The example of FIG. 5 shows embodiments, in which the test signal 322 is directed to the reception chain by using either an RF loop or an analog loop, but the example of the figure could just as well be implemented using a digital loop, in which the test signal 322 is directed in digital form to the reception chain before the transmission signal 422 passes through the analog-to-digital converter 410.

Figure 4:
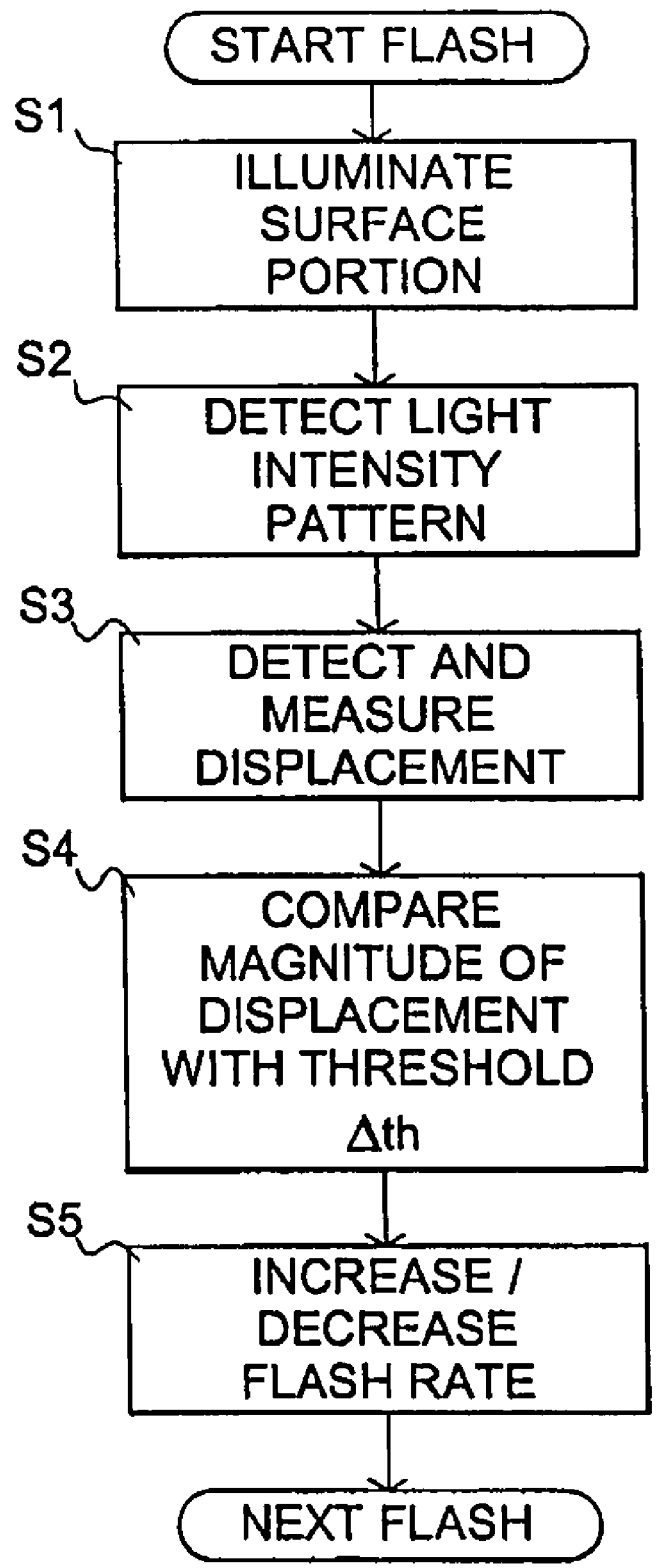
FIG. 4 is a simplified block diagram showing an example of an arrangement, in which the transmission signal of a transmitter in the receiver used in positioning is used as a test signal.

To simplify the presentation, the blocks managing different functions of the base transceiver station are shown separately in FIGS. 3 to 5. For instance, the transmission block 314 managing the transmission functions of the baseband frequency part 312 and the reception block 414 managing its reception functions are made into separate blocks, and the control unit 316 and signal source 318 are shown as separate blocks. In practice, some of the functions of different blocks, such as the transmission and reception blocks, may reside in the same block, or in a different block than shown in FIGS. 3 to 5. Similarly, the control unit 316 and signal source 318 may reside in the baseband frequency part 312, for instance. Further, it is possible to use separate antenna means for the reception and transmission of signals instead of common antenna means.

The receiver 320 used in positioning can thus also be the receiver of the user equipment 170. The receiver 320 of the user equipment 170 used in positioning comprises the same blocks and functions as the receiver of the location measurement unit residing in the base transceiver station described in the above example.

The control units 316, 218, 248 of the radio system described above and shown in FIGS. 3 to 5, which constitute the block controlling the operation of the device, and the location measurement units 202, 302, 312, and the rest of the described blocks and units can be implemented by program, for instance. They and the other required means in the core network 100, radio network 130 and user equipment 170 can, however, also be implemented as a suitable combination of software and hardware, usually a combination of software run in a processor and an electronics implementation. The typically used technology in electronics solutions is the ASIC (Application-Specific Integrated Circuit), but other types of implementations are also possible, such as a circuit built of separate logic components, or a processor with software. The processor means can be implemented by a general or signal processor or a separate logic. A hybrid of the different implementations is also possible. In selecting the implementation, a person skilled in the art takes into consideration the requirements set for the size and power consumption of the device, required processing power, manufacturing costs, and production quantities. It should be noted that FIGS. 3 to 5 mainly describe functional entities, and the parts of the practical hardware implementation may vary from what is described, because it is finally a question of how to implement in the application in question most efficiently and with reasonable costs the means implementing the desired functionality.

Let us finally describe by way of example and with reference to the block diagram of FIG. 6, the method of improving the accuracy of time measurements related to positioning in a radio system.

The method is started in step 600. In step 602, a test signal is generated. In step 604, the test signal is directed to travel through pre-selected radio frequency parts of the receiver used by the radio system in positioning. In step 606, the propagation delay of the test signal traveling through the pre-selected radio frequency parts is determined. In step 608, the determined propagation delay is used in improving the accuracy of time measurements related to positioning. The method ends in step 610.

The arrangement shown in FIGS. 3 to 5 is suitable for implementing the method and its various embodiments, but other types of arrangements are also possible.

Even though the invention has been explained in the above with reference to examples in accordance with the accompanying drawings, it is apparent that the invention is not restricted to them but can be modified in many ways within the scope of the inventive idea disclosed in the attached claims.

The invention claimed is:
1. A method, comprising:
generating a test signal;
directing the test signal to pass through pre-selected radio frequency parts of a receiver used by the radio system in positioning;

directing the test signal to travel along two routes, of which the first route goes through the pre-selected radio frequency parts, and the second route past them, and determining the propagation delay by means of a phase difference between the signals that traveled along the first and second routes;

determining a propagation delay of the test signal through the pre-selected radio frequency parts; and using the determined propagation delay in improving the accuracy of the time measurements related to positioning, wherein the method is used for improving the accuracy of time measurements related to positioning in a radio system.

2. The method as claimed in claim 1, comprising storing the time instants, when the test signal starts and ends its travel through the pre-selected radio frequency parts, and determining the propagation delay by using the stored time instants.

3. The method as claimed in claim 1, wherein the receiver used in positioning is the receiver of a location measurement unit.

4. The method as claimed in claim 1, wherein the receiver used in positioning is the receiver of the user equipment.

5. The method as claimed in claim 1, comprising signaling the determined propagation delay to a controller of the radio system.

6. The method as claimed in claim 1, comprising using the determined propagation delay in compensating delay.

7. The method as claimed in claim 1, comprising using the determined propagation delay to adjust the delay of all receivers used in positioning to be the same.

8. The method as claimed in claim 1, comprising using the determined propagation delay to calculate an absolute time.

9. The method as claimed in claim 1, comprising using the transmission signal of a radio system transmitter in the receiver used in positioning as the test signal.

10. The method as claimed in claim 1, comprising using the transmission signal of a radio system base transceiver station in the receiver used in positioning as the test signal.

11. The method as claimed in claim 1, comprising using the common pilot channel of the radio system base transceiver station in the receiver used in positioning in determining the propagation delay.

12. The method as claimed in claim 11, wherein the test signal is the common pilot channel signal with the pilot channel code sequence of the transmitter in the receiver used in positioning added to its radio frame during its idle period.

13. The method as claimed in claim 11, comprising generating the common pilot channel signal of the transmitter in the receiver used in positioning and used as the test signal.

14. The method as claimed in claim 1, comprising generating the test signal on different frequencies and determining the propagation delay on different frequencies.

15. The method as claimed in claim 1, comprising using a separate test signal generated for the purpose as the test signal.

16. The method as claimed in claim 1, comprising using a non-modulated sine wave as the test signal.

17. The method as claimed in claim 1, comprising directing one finger of a RAKE receiver used in positioning to receive the test signal.

18. An arrangement, comprising:
 a receiver to be used in positioning;
 a generating unit configured to generate a test signal;
 a directing unit configured to direct the test signal to pass through pre-selected radio frequency parts of the receiver used in positioning;
 a unit configured to direct the test signal to travel along two routes, of which the first route goes through the pre-selected radio frequency parts, and the second route past them, and to determine the propagation delay by means of a phase difference between the signals that traveled along the first and second routes;
 a determining unit configured to determine the propagation delay of the test signal through the pre-selected radio frequency parts; and
 a unit configured to use the determined propagation delay in improving the accuracy of the time measurements related to positioning,
 wherein the arrangement is configured to improve the accuracy of time measurements related to positioning in a radio system, comprising at least one user equipment to be positioned, and at least three base transceiver stations having known locations and used in positioning, of which base transceiver stations one acts as a serving base transceiver station to the user equipment.

19. The arrangement as claimed in claim 18, comprising a storing unit configured to store the time instants, when the test signal starts and ends its travel through the pre-selected radio frequency part, and determining the propagation delay by using the stored time instants.

20. The arrangement as claimed in claim 18, wherein the receiver used in positioning is the receiver of a location measurement unit in the radio system.

21. The arrangement as claimed in claim 18, wherein the receiver used in positioning is the receiver of the user equipment.

22. The arrangement as claimed in claim 18, wherein the determined propagation delay is signaled to a controller in the radio system.

23. The arrangement as claimed in claim 18, wherein the determined propagation delay is used in compensating delay.

24. The arrangement as claimed in claim 18, wherein the determined propagation delay is used to adjust the delay of all receivers used in positioning to be the same.

25. The arrangement as claimed in claim 18, wherein the determined propagation delay is used to calculate an absolute time.

26. The arrangement as claimed in claim 18, wherein the transmission signal of a radio system base transceiver station in the receiver used in positioning is used as the test signal.

27. The arrangement as claimed in claim 18, wherein the common pilot channel of the radio system base transceiver station in the receiver used in positioning is used in determining the propagation delay.

28. The arrangement as claimed in claim 27, wherein the common pilot channel signal of the transmitter in the receiver used in positioning is generated and used as the test signal.

29. The arrangement as claimed in claim 27, wherein the test signal is the common pilot channel signal with the pilot channel code sequence of the transmitter in the receiver used in positioning added to its radio frame during its idle period.

30. The arrangement as claimed in claim 18, wherein the test signal can be generated on different frequencies and the propagation delay can be determined on different frequencies.

31. The arrangement as claimed in claim 18, wherein a separate test signal generated for the purpose is used as the test signal.

32. The arrangement as claimed in claim 18, wherein a non-modulated sine wave is used as the test signal.

33. The arrangement as claimed in claim 18, wherein the arrangement comprises a RAKE receiver used in positioning and one finger of the RAKE receiver is directed to receive the test signal.

34. An apparatus, comprising:
  a receiver to be used in positioning;
  means for generating a test signal;
  means for directing the test signal to pass through pre-selected radio frequency parts of the receiver used in positioning;
  means for directing the test signal to travel along two routes, of which the first route goes through the pre-selected radio frequency parts, and the second route past them, and to determine the propagation delay by means of a phase difference between the signals that traveled alone the first and second routes;
  means for determining the propagation delay of the test signal through the pre-selected radio frequency parts; and
  means for using the determined propagation delay in improving the accuracy of the time measurements related to positioning,
  wherein the arrangement is configured to improve the accuracy of time measurements related to positioning in a radio system, comprising at least one user equipment to be positioned, and at least three base transceiver stations having known locations and used in positioning, of which base transceiver stations one acts as a serving base transceiver station to the user equipment.

* * * * *